L. C. TEEL.
CHICKEN BROODER.
APPLICATION FILED MAY 28, 1917.
1,265,548.
Patented May 7, 1918.
2 SHEETS—SHEET 1.
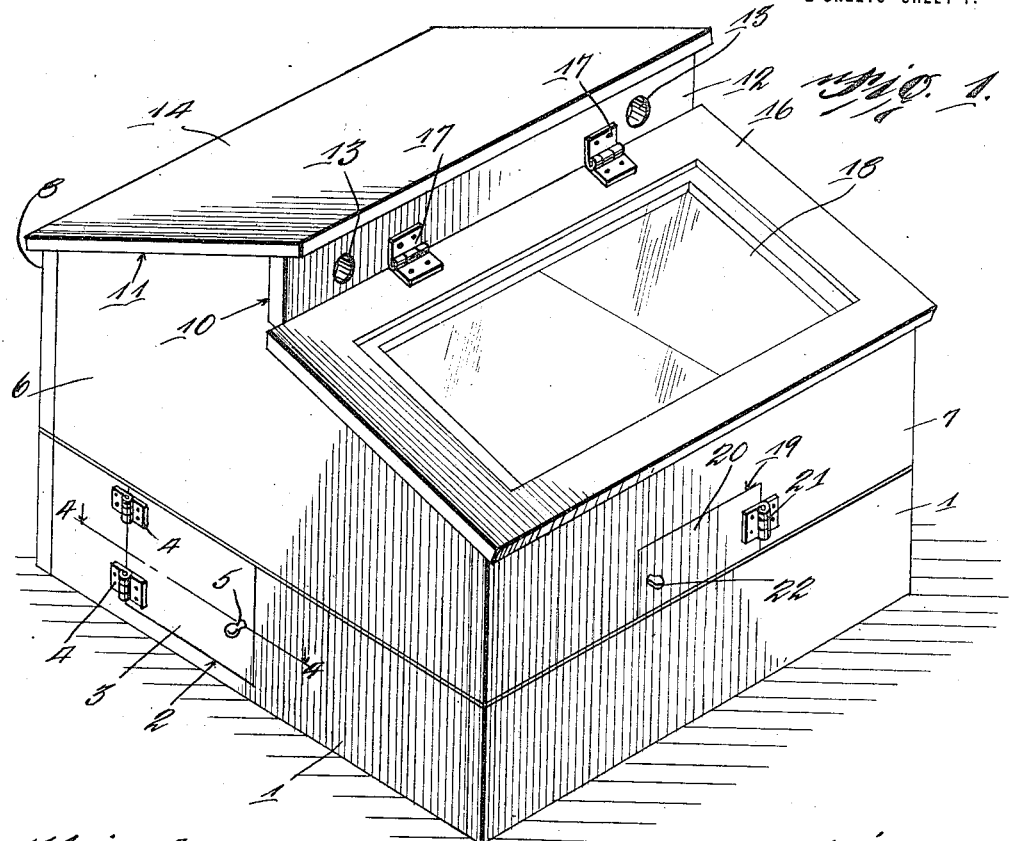
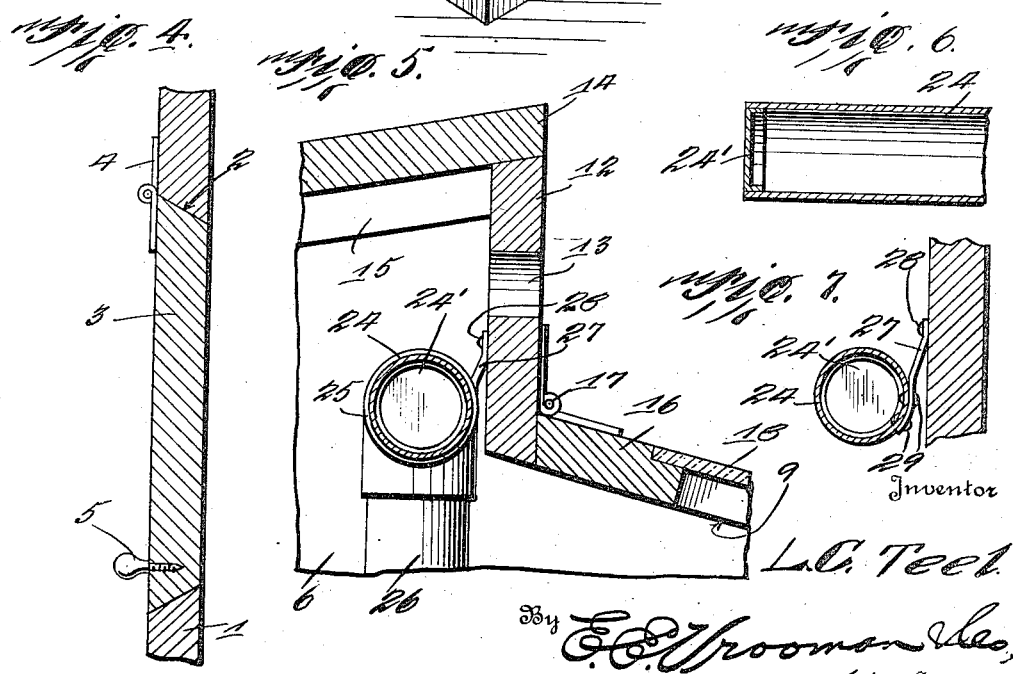
Inventor
L. C. Teel
By E. E. Vrooman & Co.,
his Attorneys

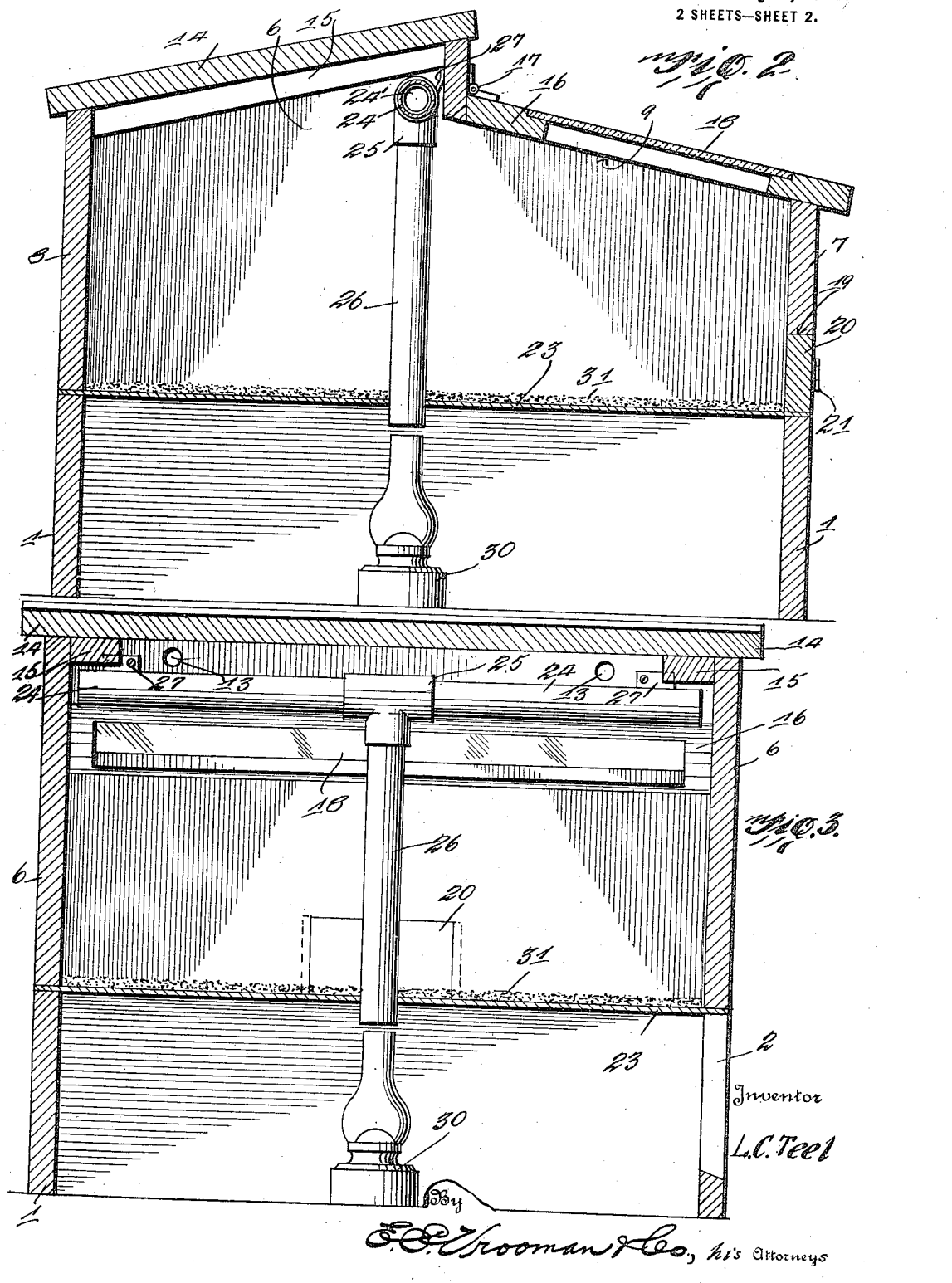

UNITED STATES PATENT OFFICE.

LLOYD C. TEEL, OF MENTONE, INDIANA.

CHICKEN-BROODER.

1,265,548.  Specification of Letters Patent.  Patented May 7, 1918.

Application filed May 28, 1917. Serial No. 171,503.

*To all whom it may concern:*

Be it known that I, LLOYD C. TEEL, a citizen of the United States of America, residing at Mentone, in the county of Kosciusko and State of Indiana, have invented certain new and useful Improvements in Chicken-Brooders, of which the following is a specification.

This invention relates to a chicken brooder, and has for its principal object the production of a simple and efficient means for thoroughly and uniformly heating the interior of the brooder.

Another object of this invention is the production of a chicken brooder having its body carried upon a base in such manner as to permit a lamp to be positioned below the floor of the brooder for heating the same, thereby presenting a warm floor upon which the chicks may stand.

A still further object of this invention is the production of a chicken brooder wherein a vertical pipe is connected to a horizontal pipe so as to present a substantially T-shaped structure for permitting heat from the lamp carried within the base of the brooder to enter the pipes, thereby causing the pipes to radiate heat within the brooder and thus uniformly heat the same.

With these and other objects in view this invention consists of certain novel combinations, constructions, and arrangements of parts as will be hereinafter fully described and claimed.

In the accompanying drawings:—

Figure 1 is a detail perspective view of the complete chicken brooder as constructed in accordance with this invention.

Fig. 2 is a central transverse section through the chicken brooder.

Fig. 3 is a central longitudinal section through the chicken brooder taken at right angles to Fig. 2.

Fig. 4 is a section taken on the line 4—4 of Fig. 1.

Fig. 5 is an enlarged fragmentary sectional view through the upper portion of the chicken brooder illustrating the manner in which the horizontal pipe is carried with respect to the removable top of the hinged lid.

Fig. 6 is a sectional view through one end of the horizontal pipe.

Fig. 7 is a transverse sectional view through the horizontal pipe, illustrating the manner in which the same is supported upon one of the hanger brackets.

Referring to the accompanying drawings by numerals it will be seen that the base comprises a plurality of sides 1 secured together so as to form a substantially rectangular structure. One of the sides 1 is provided with an opening 2 within which the door 3 is adapted to fit. Hinges 4 are fixedly mounted upon the top 3 of the side 1 having the opening 2 formed therein for pivotally supporting the door 3. The knob 5 is carried by the door for facilitating the opening or closing of the door as desired. By having the door carried by one of the sides 1 it will be seen that access may be easily had to the interior of the base 1.

The body of the brooder comprises a pair of ends 6 a front wall 7 and a rear wall 8. The ends 6 are connected to the front and rear walls 7 and 8 so as to form an inclosed structure, as clearly shown in Figs. 1 and 2. The front wall 7 is considerably lower in its height than the rear wall 8, while the ends 6 have slanting edges 9 which extend to the vertical edges 10, which vertical edges 10 communicate with the slanting top edges 11. The strip 12 is fixedly mounted upon the vertical edges 10 and this strip 12 has ventilator openings 13 formed therein, as clearly shown in Figs. 1 and 5. The removable top 14 has cleats 15 fixedly mounted upon its lower surface so that when the removable top 14 is positioned upon the upper edge of the rear wall 8, the strip 12 and the slanting edges 11 of the ends 6, the top 14 will rest evenly thereon, while the cleats 15 will engage the inner portions of the rear wall and ends of the strip 12 for holding the top 14 against accidental displacement. It is of course, obvious that when so desired the top 14 may be removed so as to allow free access to the interior of the brooder body when it is desired to clean the same.

A hinged lid 16 is connected to the longitudinally extending strip 12 by means of the hinges 17, whereby the hinged lid 16 will normally rest upon the slanting edges 9 of the ends 6 and upon the upper edge of the forward wall 7. A glass panel 18 is carried by the lid 16 so as to permit light or sunshine to pass into the brooder for lighting the same and also increasing the warmth thereof when the brooder is placed in the sunshine.

The forward wall 7 is also provided with an opening 19 which is normally closed by the door 20 secured by the hinge 21 to the forward wall 7. This door 20 has a knob 22 for facilitating the opening or closing thereof as desired.

The bottom 23 is preferably formed of a single sheet of material and is carried upon the upper portions of the base so as to engage the lower portions of the brooder body. At a glance it will be seen that the chicks will be retained within the brooder body above the base.

A horizontal pipe 24 extends from each end of the elbow 25, while the vertical pipe 26 depends from the elbow 25 and projects through the bottom 23, as shown clearly in Figs. 2 and 3. The hanger brackets 27 are secured together by means of tacks or any other suitable securing members 28 to the inner surface of the longitudinally extending strip 12, while the lower ends of these hanger brackets 27 are secured by means of rivets 29 to the horizontally extending pipes 24. By supporting the pipes in this manner it will be seen that the pipes will be held adjacent the top of the brooder upon the inner surface of the strip 12. The lamp 30 is positioned within the base of the brooder directly below the depending lower end of the vertical pipe 26. As a consequence, when the lamp is lighted the heat radiated from the lamp will heat the interior of the base so as to heat the sheet metal bottom 23. In order to prevent this bottom 23 from being overheated and burning the feet of the chicks sand or other suitable non-conducting material is placed upon the bottom 23, as shown at 31, so as to be heated by the bottom 23, although not heated to such a high degree as to burn the feet of the chicks, as above explained. The heat from the lamp 30 will also pass up the vertical pipe 26, through the elbow 25, to the horizontal pipes 24. The caps 24' are interposed in the ends of the horizontal pipes 24 so as to prevent the escape of the heated air from the pipes into the interior of the brooder body. It is well known that the gas caused by the burning of the lamp is not beneficial within a small area, such for instance, as a brooder body, and as a consequence, the ends of the pipes 24 are closed. The heated air, however, passes up through the vertical pipe into the horizontal pipes, while the cooler air within the horizontal pipes will pass from the pipes 24 and down through the vertical pipe 26 into the base of the brooder. In this manner a circulation of air is maintained within the vertical pipe 26 and the horizontal pipes 24, permitting the pipes to be filled with heated air. This heated air, of course, will heat the pipes 26 and 24 which pipes will in turn radiate heat into the interior of the brooder body, so as to uniformly heat the same, whereby the young chicks standing upon the heated sand upon the bottom 23 will be thoroughly warmed because of the heated condition of the sand and the heated condition of the air within the brooder body. It is obvious that super-heating of the brooder body is prevented inasmuch as excessive heat will pass from the brooder body and escape through the ventilator openings 13. It will also be seen that the door 20 may also be opened when desired for permitting the chicks to pass from the interior of the brooder body, while the lid 16 may be opened whenever it is desired to feed the chicks or for permitting access to the interior of the brooder body when it is not desired to remove the top 14.

From the foregoing description it will be seen that a very efficient chicken brooder has been produced which is adapted to be efficiently heated without the passing of the injurious and obnoxious gas from the lamp into the brooder, inasmuch as the air within the T-shaped pipe structure will be heated so as to heat the pipes and cause the heat to be radiated within the brooder body, while the bottom will also be heated so as to present a warm surface upon which the young chicks may stand.

What is claimed is:—

1. In a brooder of the class described, the combination with a body, of a top-structure thereon provided with a horizontal strip having ventilating openings, a pair of hanger-brackets fastened to said horizontal strip of the top-structure near the ends of the said strip and near the ventilating openings, a heating pipe up near the roof-structure and resting on said brackets, and means for supplying heat to said heating pipe.

2. In a brooder of the class described, the combination with a body, of a top-structure thereon provided with a horizontal strip, said strip provided with ventilating openings, a plurality of vertical brackets attached to the inner face of said strip, each bracket comprising a central body positioned at an angle to the ends, and the upper end of each bracket fastened to said strip and the angularly disposed body spacing the lower end from said strip, a pipe engaging said lower end of each bracket, said lower end conforming to the shape of the outer surface of said pipe, means fixedly fastening said pipe to the lower end of each bracket, and means for supplying heat to said pipe.

In testimony whereof I affix my signature in the presence of two witnesses.

LLOYD C. TEEL.

Witnesses:
E. M. EDDINGER,
A. I. NELSON.